Oct. 20, 1942.   E. E. BALDWIN   2,299,201
ENGINE STARTER GEARING
Original Filed Nov. 26, 1938
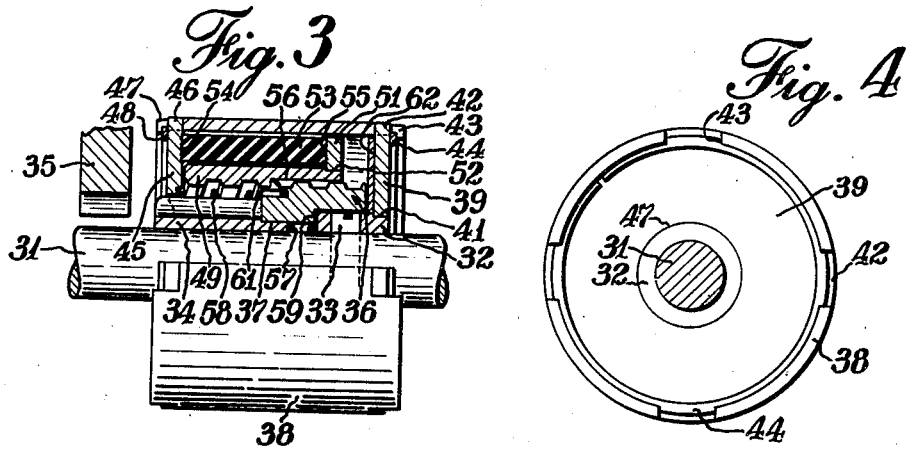
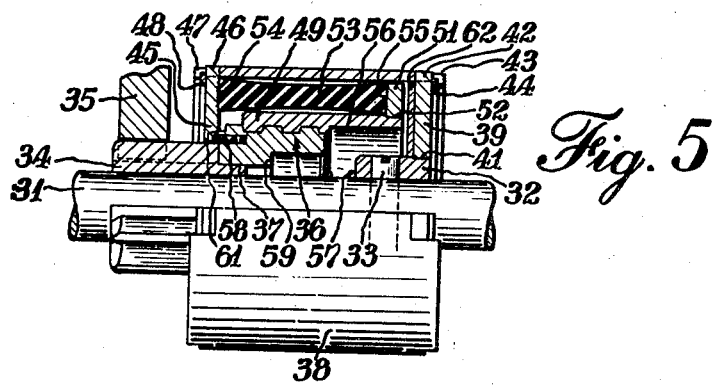
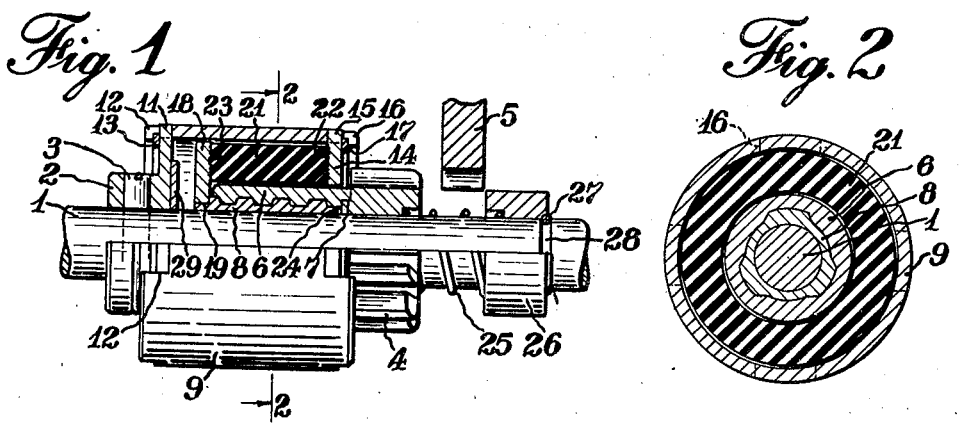
Witness:
Burr W. Jones
INVENTOR.
Everett E. Baldwin
BY Clinton S. James
ATTORNEY.

Patented Oct. 20, 1942

2,299,201

UNITED STATES PATENT OFFICE 2,299,201

ENGINE STARTER GEARING

Everett E. Baldwin, Elmira, N. Y., assignor to Bendix Aviation Corporation, South Bend, Ind., a corporation of Delaware Original application November 26, 1938, Serial No. 242,545. Divided and this application October 1, 1940, Serial No. 359,259

12 Claims. (Cl. 74—7)

The present invention relates to engine starter gearing and more particularly to a starter drive incorporating an elastic element which is placed under tension by the transmission of starting torque.

This application is a division of application Serial Number 242,545, filed November 26, 1938, patented on Dec. 23, 1940, Number 2,226,544.

The increasing strictness of space limitations with respect to automotive engine auxiliaries has emphasized the desirability of reducing the size, and particularly the overall length of starter drives without affecting their torque capacity or operating characteristics. Various forms of starting devices utilizing yielding driving members of elastically deformable material such as rubber under compression have been suggested. It has been found, however, that such members are subject to abrasion by rubbing on the walls of their containers, causing disintegration of the members and sticking of the drives due to the accumulation of rubber particles on the working surfaces. Moreover, when the yielding member is compressed, its end portions become wedged in their seats so as to interfere with the deformation and displacement thereof so that when the drive is under load, the elasticity of the yielding member is confined substantially to its central portions, and the member is not uniformly stressed throughout its length.

The perfection of methods for bonding rubber and rubber substitutes to metal has permitted the use of such materials in situations in which they have not hitherto been available, and it is now proposed to utilize this advanced technology in producing a starter drive incorporating both dimensional and operative improvements.

It is an object of the present invention to provide a novel engine starter drive which is small and compact in comparison to earlier types of drives having equal torque capacity.

It is another object to provide such a device which has improved operating characteristics particularly in respect to the yielding driving connection.

It is a further object to provide such a device which is efficient and reliable in operation while being simple and economical in construction.

It is another object to provide such a device incorporating a member of elastically deformable material which is placed under tension when torque is transmitted through the drive.

It is another object to provide such a device in which the elastic member is subjected to both tension and torsion during the cranking operation.

Further objects and advantages will be apparent from the following description taken in connection with the accompany drawing in which:

Fig. 1 is a side elevation partly in section of a starter drive embodying a preferred form of the invention, showing the parts in idle or disengaged position;

Fig. 2 is a section taken substantially on the line 2—2 of Fig. 1;

Fig. 3 is a side elevation partly in section of a second embodiment of the invention showing the parts in idle position;

Fig. 4 is an end view thereof; and

Fig. 5 is a view similar to Fig. 3, showing the parts in driving position.

In Figs. 1 and 2 of the drawing a power shaft 1 has fixed thereon a drive member 2 by suitable means such as a pin 3, and a pinion member 4 is slidably journalled on the power shaft for movement into and out of engagement with a member such as a flywheel gear 5 of an engine to be started. Pinion 4 has a tubular threaded extension 6 suitably fixed thereto as by welding as indicated at 7, and a screw shaft 8 is slidably journalled on the power shaft 1 in threaded engagement therewith.

A barrel member 9 is arranged to surround the threaded members and the drive member 2 and is fixedly connected to the drive member 2 for rotation therewith as by means of radial lugs 11 of the drive member fitting within notches 12 in the end of the barrel and retained therein by suitable means such as a split ring 13.

A flange member 14 is rigidly mounted in the opposite end of the barrel by means of radial lugs 15 seated in notches 16 in the barrel and retained therein by means of a lock ring 17. A flange member 18 is rigidly connected to the screw shaft 8 as by welding as indicated at 19, and a yielding transmission element 21 of elastically deformable material is suitably bonded as indicated at 22 and 23 to the flanges 14 and 18 respectively to form a yielding driving connection therebetween.

The idle position of the pinion 4 is defined by its abutment with the end 24 of the screw shaft, in which position it is normally maintained by an anti-drift spring 25. The operative position of the pinion is defined by a stop member 26 located on the power shaft 1 by means of a thrust ring 27 seated in a groove 28 in the shaft.

In the operation of this embodiment of the invention, rotation of the power shaft 1 is transmitted through the drive member 2, barrel 9, flange member 14, transmission member 21 and flange member 18 to the screw shaft 8. The pinion 4 is thereupon projected toward the flywheel gear 5 by the cooperation of its threaded extension 6 with the screw shaft 8 whereby the pinion is moved into operative position against its stop 26. Longitudinal movement of the pinion being thus interrupted, rotation is transmitted thereto from the power shaft yieldingly by virtue of the stretching of the yielding transmission member 21 by backward movement of the screw shaft 8, and also by the torsional elasticity of the transmission member. Stretching of the transmission member is limited by engagement of the end of the screw shaft 8 and flange member 18 with a thrust washer 29 seated against the driving member 2, after which engagement the operation of the drive is cushioned further by the torsional elasticity of the transmission member.

In the embodiment of the invention illustrated in Figs. 3, 4 and 5 the drive is arranged so that when in idle position, the pinion is completely housed within the drive, so as to make a very short compact form of drive.

As illustrated in Fig. 3 a power shaft 31 has fixed thereon a driving member 32 as by means of a pin 33. A pinion 34 is slidably journalled on the power shaft for movement into and out of engagement with an engine flywheel gear 35, and has a screw shaft 36 rigidly fixed thereto as by welding at 37.

A barrel member 38 is arranged to enclose the parts of the drive, and is rigidly connected to the drive member 32 by means of a disc 39 welded to the driving member as indicated at 41 and having radial lugs 42 extending into notches 43 in the end of the barrel and held therein by means of a lock ring 44.

A flange member 45 is rigidly fixed in the other end of the barrel as by means of radial lugs 46 seated in notches 47 and maintained therein by means of a lock ring 48. A hollow threaded sleeve 49 is mounted on the screw shaft 36 and has a flange member 51 fixed thereto as by welding as indicated at 52. Flange members 45 and 51 are yieldingly connected by means of a transmission member 53 of elastically deformable material bonded as indicated at 54 and 55 to the flanges 45 and 51 respectively.

The threaded sleeve 49 is preferably provided with a smooth counterbored portion 56 permitting the screw shaft to run off the ends of the threads in the sleeve when the pinion overruns the drive. A reentry spring 57 is provided for maintaining initial engagement of the threads of the screw shaft with the threads of the sleeve, and an anti-drift spring 58 is provided for yieldingly maintaining the pinion in its idle position.

In this embodiment of the invention, the operative position of the pinion is defined by the abutment of the forward end 61 of the screw shaft against the flange member 45.

In operation, rotation of the power shaft 31 is transmitted through drive member 32, disc 39, barrel 38, flange member 45, transmission member 53 and flange 51 to the threaded sleeve 49. The pinion 34 and screw shaft 36 are thus caused to be threaded out of the barrel into engagement with the engine gear 35 until the end of the screw shaft abuts the flange member 45. Rotation is thereupon transmitted to the pinion yieldingly by virture of the stretching and torsional elasticity of the transmission member 53. The stretching of the transmission member is limited by engagement of the flange 51 with a thrust washer 62 seated against the disc 39 of the driving member.

When the engine starts, overrunning of the pinion causes it to be threaded back into the sleeve 49 until the screw shaft 36 runs off the ends of the threads in the sleeve. The pinion and screw shaft can then overrun freely until their momentum is dissipated, after which initial engagement of the threads is effected by the reentry spring 57, the parts being maintained in their idle positions as illustrated by the anti-drift spring 58.

Although certain embodiments of the invention have been shown and described in detail, it will be understood that other embodiments are possible and various changes may be made in the arrangements and proportions of the parts without departing from the spirit of the invention as defined in the claims appended hereto.

What is claimed is:

1. In an engine starter gear, a power shaft, a pinion member slidably journalled thereon for movement into and out of engagement with a member of an engine to be started, a flange member threaded to the pinion member in telescopic relation therewith, a driving member rigidly connected to the shaft having a flange located in advance of the threaded flange member in the direction of travel of the pinion member into operative position, a cylindrical block of elastically deformable material surrounding the telescoped members and having its ends bonded to the flanges of the threaded and driving members respectively to form a tensile connection therebetween, and stop means independent of the threaded flange member engageable by the pinion member when in driving position.

2. In an engine starter gear, a power shaft, a pinion member slidably journalled thereon for movement into and out of engagement with a member of an engine to be started, a flange member threaded thereto in telescopic relation, a barrel member rigidly connected to the shaft in telescopic relation to the threaded member and including a flange located in advance of the flange of the threaded member in respect to the engaging movement of the pinion, and a cylindrical block of elastically deformable material in said barrel having its ends rigidly attached to said flanges to form a tractive and torsional connection therebetween.

3. In an engine starter drive, a power shaft, a pinion slidably journalled theron for movement into and out of engagement with a member of an engine to be started, a barrel member fixed to the shaft having an inwardly extending flange at its end adjacent the engine member, a screw shaft within the barrel member fixed at one end to the pinion, a hollow threaded sleeve in the barrel member threaded on the screw shaft having a radial flange at its end remote from the engine member, and a cylinder of elastically deformable material fixed at its ends to the flanges of the barrel member and sleeve respectively, said barrel member flange forming stop means adapted to define the operative position of th pinion.

4. In an engine starter drive, a power shaft, a barrel member rigidly connected to the shaft at one end and having an annular flange fixed in the other end, a pinion member telescoped in the barrel member, a sleeve in the barrel threaded on the pinion and arranged to project the pinion through the annular flange of the barrel into engagement with an engine member upon acceleration of the drive, and an elastic member surrounding the sleeve in the barrel connected at its ends to the sleeve and barrel flange respectively and forming the sole driving connection therebetween, said barrel flange forming abutment means limiting the projection of the pinion member from the barrel.

5. In an engine starter, the combination of: a driving shaft; a pinion movable along the shaft to and from engagement with an engine member; a sleeve on the pinion; a member having a screw connection with the pinion sleeve and operable upon rotation with the shaft to propel the pinion toward its operative position; an endwise and torsionally resilient driving connection between said member and the shaft; and means encircling said member and the driving connection and engageable with a part on the pinion sleeve to limit motion of the pinion toward operative position.

6. In an engine starter, the combination of: a drive shaft; a drive member including a pinion and movable along the shaft to and from an operative position engaging an engine member; an actuating member loose on the shaft and having a threaded connection with the drive member whereby relative rotation between the drive member and said actuating member effects endwise movement of one with respect to the other; a resilient driving connection from the shaft to said actuating member; and means covering the driving connection and the threaded connection and having a portion engageable with the drive member to limit movement of the drive member and define its operative position.

7. In an engine starter, the combination of: a drive shaft; a drive member including a pinion and movable axially along the drive shaft and rotatable therewith; a driving connection from the shaft to the drive member operable to automatically propel the drive member toward its operative position upon initial rotation of the drive shaft, said driving connection having endwise and torsional resiliency provided by a rubber collar through which driving torque is transmitted; an outer shell; means securing the outer shell to the shaft; said shell encircling the driving connection between the shaft and the drive member; and an abutment on the end of the shell nearest the pinion engageable with a part on the drive member to limit endwise movement of the drive member in one direction.

8. In an engine starter including a shaft and a pinion movable longitudinally thereof and rotatably therewith and a driving connection between the shaft and the pinion to effect such motion of the pinion, said driving connection having torsional and endwise resiliency provided by a rubber drive transmission: a stop for limiting longitudinal movement of the pinion toward operative position; means for supporting the stop from means carried by the shaft at a point remote from the pinion, said stop supporting means being wholly disposed exteriorly of said driving connection and forming a protecting housing therefor; and an abutment movable with the pinion and engageable with said stop.

9. In an engine starter, the combination of a driving shaft, a pinion movable along the shaft to and from engagement with an engine member, a threaded sleeve on the pinion, a hollow screw shaft having a screw connection with the pinion sleeve and operable upon rotation with the shaft to propel the pinion toward its operative position, an endwise and torsionally resilient driving connection between said screw shaft and the shaft including a flange fixed to the shaft, a body of elastically deformable material yieldingly resisting movement of said screw shaft away from the operative position of the pinion, a barrel encircling the screw shaft and body rigidly connected at one end to the flange, and an abutment rigid with the opposite end of the barrel and engageable with a part on the pinion sleeve to limit motion of the pinion toward operative position.

10. In an engine starter, the combination of a drive shaft, a drive member including a pinion and movable along the shaft to and from an operative position engaging an engine member, a hollow screw shaft loosely surrounding the drive shaft and having a threaded connection with the drive member whereby relative rotation between the drive member and said screw shaft effects endwise movement of one with respect to the other, an endwise and torsionally resilient driving connection from the drive shaft to said screw shaft including a flange fixed to the drive shaft, a body of elastically deformable material yieldingly resisting movement of said screw shaft, a barrel rigidly connected at one end to the flange, surrounding the threaded connection, and an abutment rigid with the opposite end of the barrel engageable with the drive member to limit movement of the drive member and define its operative position.

11. In an engine starter, the combination of a drive shaft, a drive member including a pinion and movable axially along the drive shaft and rotatable therewith, an endwise and torsionally resilient driving connection from the shaft to the drive member operable to automatically propel the drive member toward its operative position upon initial rotation of the drive shaft, said driving connection including a sleeve threaded to the drive member, a rubber collar through which driving torque is transmitted to the sleeve, an outer shell and means securing the outer shell to the shaft, said shell encircling the rubber collar and securing means, and an abutment on the end of the shell nearest the pinion engageable with a part on the drive member to limit endwise movement of the drive member in one direction.

12. In an engine starter, a shaft, a pinion movable longitudinally thereof and rotatably therewith and an endwise and torsionally resilient driving connection between the shaft and the pinion to effect such motion of the pinion, said driving connection including a hollow screw shaft threaded to the pinion, a body of elastically deformable material through which torque is transmitted to the screw shaft, a flange fixed to the shaft at a point remote from the pinion, a barrel fixed to the flange and a stop for limiting longitudinal movement of the pinion toward operative position, said barrel being wholly disposed exteriorly of the screw shaft and the body of elastically deformable material and forming a protecting housing therefor, and an abutment movable with the pinion and engageable with said stop.

EVERETT E. BALDWIN.